US010708378B2

(12) United States Patent
Li (10) Patent No.: US 10,708,378 B2
(45) Date of Patent: Jul. 7, 2020

(54) DATA PROCESSING METHOD AND APPARATUS, SERVER, AND CONTROLLER (71) Applicant: Huawei Technologies Co., Ltd., Shenzhen (CN)

(72) Inventor: Langbo Li, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 87 days.

(21) Appl. No.: 15/845,748

(22) Filed: Dec. 18, 2017

(65) Prior Publication Data

US 2018/0109641 A1 Apr. 19, 2018

Related U.S. Application Data (63) Continuation of application No. PCT/CN2016/087916, filed on Jun. 30, 2016.

(30) Foreign Application Priority Data

Sep. 29, 2015 (CN) .......................... 2015 1 0629504

(51) Int. Cl.
G06F 15/16 (2006.01)
H04L 29/08 (2006.01)
G06F 3/06 (2006.01)

(52) U.S. Cl.
CPC .......... H04L 67/2833 (2013.01); G06F 3/061 (2013.01); G06F 3/067 (2013.01);
(Continued)

(58) Field of Classification Search
CPC ........ G06F 3/0659; G06F 3/061; G06F 3/067; G06F 3/0656; H04L 29/08; H04L 67/1097; H04L 67/283
(Continued)

(56) References Cited

U.S. PATENT DOCUMENTS 5,958,080 A * 9/1999 Kang .................... H03M 13/00
714/807
2003/0145045 A1* 7/2003 Pellegrino ............. G06F 3/0601
709/203
(Continued)

FOREIGN PATENT DOCUMENTS

CN 1543092 A 11/2004
CN 1633131 A 6/2005
(Continued)

OTHER PUBLICATIONS

Machine Translation and Abstract of Chinese Publication No. CN103617136, Mar. 5, 2014, 19 pages.
(Continued)

Primary Examiner — Dustin Nguyen
Assistant Examiner — Hao H Nguyen
(74) Attorney, Agent, or Firm — Conely Rose, P.C.

(57) ABSTRACT

A data processing method and apparatus, a server, and a controller, where the method includes receiving, by a server, a data processing request, where the data processing request includes a request sequence number, and the request sequence number marks the data processing request, generating at least one input/output (I/O) request according to the data processing request, adding the request sequence number to each of the at least one I/O request, merging the I/O requests having the request sequence number, and generating an aggregation instruction when a quantity of I/O requests having the request sequence number is greater than a preset threshold, and sending the aggregation instruction to a controller of a storage system. Hence, a time taken to perform monitoring and management using a transaction mechanism can be reduced, thereby simplifying the transaction mechanism.

11 Claims, 4 Drawing Sheets (52) U.S. Cl.
CPC .......... *G06F 3/0656* (2013.01); *G06F 3/0659* (2013.01); *H04L 29/08* (2013.01); *H04L 67/1097* (2013.01)

(58) Field of Classification Search
USPC ...... 709/223, 203, 217, 218, 219; 710/5, 10, 710/19, 22; 711/100, 114, 155, 162, 200, 711/202; 714/19, 799, 807, 808
See application file for complete search history.

(56) References Cited

U.S. PATENT DOCUMENTS

| | | | | |
|---|---|---|---|---|
| 2003/0177290 | A1* | 9/2003 | Ayukawa | G06F 3/0601 710/10 |
| 2004/0027991 | A1* | 2/2004 | Jang | H04L 1/1671 370/230 |
| 2009/0063591 | A1* | 3/2009 | Betten | G06F 16/122 |
| 2009/0112561 | A1* | 4/2009 | Behm | G06F 30/33 703/17 |
| 2009/0222596 | A1* | 9/2009 | Flynn | G06F 3/061 710/22 |
| 2010/0070656 | A1 | 3/2010 | Snell et al. | |
| 2013/0007755 | A1* | 1/2013 | Chambliss | G06F 9/46 718/103 |
| 2013/0017804 | A1* | 1/2013 | Jun | H04W 28/0205 455/410 |
| 2013/0054841 | A1* | 2/2013 | Padia | G06F 3/061 710/5 |
| 2013/0290571 | A1* | 10/2013 | Rizzo | G06F 11/0745 710/19 |
| 2015/0081967 | A1* | 3/2015 | Pan | G06F 3/0656 711/114 |
| 2015/0378620 | A1* | 12/2015 | Brown | G06F 3/0619 711/162 |
| 2016/0041885 | A1* | 2/2016 | Arai | G06F 11/1451 714/19 |
| 2016/0087758 | A1* | 3/2016 | Nekuii | H04L 1/0045 714/807 |
| 2016/0162159 | A1* | 6/2016 | Lian | G06F 16/957 715/771 |
| 2017/0265140 | A1* | 9/2017 | Dodonov | H04W 52/0274 |

FOREIGN PATENT DOCUMENTS

| | | |
|---|---|---|
| CN | 103106043 A | 5/2013 |
| CN | 103605726 A | 2/2014 |
| CN | 103617136 A | 3/2014 |
| CN | 104102742 A | 10/2014 |
| CN | 104636201 A | 5/2015 |
| CN | 105282244 A | 1/2016 |

OTHER PUBLICATIONS

Machine Translation and Abstract of Chinese Publication No. CN104636201, May 20, 2015, 15 pages.
Machine Translation and Abstract of Chinese Publication No. CN105282244, Jan. 27, 2016, 22 pages.
Foreign Communication From a Counterpart Application, PCT Application No. PCT/CN2016/087916, English Translation of International Search Report dated Sep. 30, 2016, 2 pages.
Foreign Communication From a Counterpart Application, European Application No. 16850164.1, Extended European Search Report dated Mar. 6, 2018, 7 pages.
Machine Translation and Abstract of Chinese Publication No. CN1543092, Nov. 3, 2004, 11 pages.
Machine Translation and Abstract of Chinese Publication No. CN1633131, Jun. 29, 2005, 51 pages.
Machine Translation and Abstract of Chinese Publication No. CN103605726, Feb. 26, 2014, 35 pages.
Machine Translation and Abstract of Chinese Publication No. CN104102742, Oct. 15, 2014, 20 pages.
Foreign Communication From a Counterpart Application, Chinese Application No. 201510629504.4, Chinese Office Action dated Dec. 28, 2017, 5 pages.

\* cited by examiner

DATA PROCESSING METHOD AND APPARATUS, SERVER, AND CONTROLLER

CROSS-REFERENCE TO RELATED APPLICATIONS

This application is a continuation of International Patent Application No. PCT/CN2016/087916 filed on Jun. 30, 2016, which claims priority to Chinese Patent Application No. 201510629504.4 filed on Sep. 29, 2015. The disclosures of the aforementioned applications are hereby incorporated by reference in their entireties.

TECHNICAL FIELD

The present disclosure relates to the field of data transmission technologies, and in particular, to a data processing method and apparatus, a server, and a controller.

BACKGROUND

With emergence of devices such as fiber channel storage devices and fiber channel switches, the storage field enters a new networking stage, storage area networks (SANs) emerge, and sharing of storage devices is implemented. A server may directly access data in multiple storage devices in a storage system using a storage network.

In other approaches, a server usually merges multiple input/output (I/O) requests before sending the I/O requests to improve data access efficiency. In addition, I/O requests that can be merged need to be used to access a same storage device. If the server needs to access multiple storage devices as requested by I/O requests generated according to one data processing request, in the other approaches, the I/O requests of the different storage devices may be dispersed to different aggregation instructions, and then the different aggregation instructions are separately sent to corresponding storage devices to complete read/write operations. To ensure data consistency, in the other approaches, a transaction mechanism is added to monitor and manage I/O requests of a same data processing request. Because times taken to process aggregation requests of different storage devices are different, a time taken to manage a data processing request using the transaction mechanism is extended, increasing the load of the transaction mechanism. It may be learned that a SAN currently requires a complex transaction mechanism to manage I/O requests of different storage devices in a same data processing request.

SUMMARY

Embodiments of the present disclosure provide a data processing method and apparatus, a server, and a controller to resolve a problem that a SAN currently requires a complex transaction mechanism to manage I/O requests of different storage devices in a same data processing request.

A first aspect of the embodiments of the present disclosure provides a data processing method that is applied to a data processing system. The data processing system includes a server and a storage system, and the storage system includes a controller and multiple storage devices. The method is performed by the server, and includes receiving a data processing request, where the data processing request includes a request sequence number, and the request sequence number is used to mark the data processing request, generating at least one I/O request according to the data processing request, adding the request sequence number to each of the at least one I/O request, merging the I/O requests having the request sequence number, and generating an aggregation instruction when a quantity of I/O requests having the request sequence number is greater than a preset threshold, and sending the aggregation instruction to the controller of the storage system.

In a first possible implementation of the first aspect, the aggregation instruction includes an operation field of each merged I/O request and the quantity of the merged I/O requests.

With reference to the first aspect or the first possible implementation of the first aspect, in a second possible implementation of the first aspect, the method further includes receiving a reminder message that is sent by the controller of the storage system and that indicates an error in parsing the aggregation instruction, and resending the aggregation instruction to the controller of the storage system.

A second aspect of the embodiments of the present disclosure provides another data processing method that is applied to a data processing system. The data processing system includes a server and a storage system, and the storage system includes a controller and multiple storage devices. The method is performed by the controller, and includes receiving an aggregation instruction sent by the server, parsing the aggregation instruction to obtain an operation field of at least one I/O request having a request sequence number and a quantity of I/O requests, collecting statistics on a quantity of operation fields of the at least one I/O request having the request sequence number, determining whether the quantity of operation fields of the at least one I/O request having the request sequence number is the same as the quantity of I/O requests, performing processing according to the operation field of the at least one I/O request if the quantity of operation fields of the at least one I/O request having the request sequence number is the same as the quantity of I/O requests, or sending, to the server, a reminder message that indicates an error in parsing the aggregation instruction if the quantity of operation fields of the at least one I/O request having the request sequence number is not same as the quantity of I/O requests.

A third aspect of the embodiments of the present disclosure provides a data processing apparatus that is used in a server of a data processing system. The data processing system further includes a storage system, and the storage system includes a controller and multiple storage devices. The data processing apparatus includes a receiving unit configured to receive a data processing request, where the data processing request includes a request sequence number, and the request sequence number is used to mark the data processing request, a generation unit configured to generate at least one I/O request according to the data processing request, an adding unit configured to add the request sequence number to each of the at least one I/O request, a merging unit configured to merge the I/O requests having the request sequence number, and generate an aggregation instruction when a quantity of I/O requests having the request sequence number is greater than a preset threshold, and a sending unit configured to send the aggregation instruction to the controller of the storage system.

In a first possible implementation of the third aspect, the aggregation instruction includes an operation field corresponding to each merged I/O request and the quantity of the merged I/O requests.

With reference to the third aspect or the first possible implementation of the third aspect, in a second possible implementation of the third aspect, the receiving unit is further configured to receive a reminder message that is sent by the controller of the storage system and that indicates an error in parsing the aggregation instruction, and the sending unit is further configured to resend the aggregation instruction to the controller of the storage system.

A fourth aspect of the embodiments of the present disclosure provides another data processing apparatus. The data processing apparatus is used in a controller of a storage system in a data processing system, the data processing system further includes a server and the storage system, and the storage system further includes multiple storage devices. The data processing apparatus includes a receiving unit configured to receive an aggregation instruction sent by the server, a parsing unit configured to parse the aggregation instruction to obtain an operation field of at least one I/O request having a request sequence number and a quantity of I/O requests, a statistics collecting unit configured to collect statistics on a quantity of operation fields of the at least one I/O request having the request sequence number, a determining unit configured to determine whether the quantity of operation fields of the at least one I/O request having the request sequence number is the same as the quantity of I/O requests, a processing unit configured to perform processing according to the operation field of the at least one I/O request when the quantity of operation fields of the at least one I/O request having the request sequence number is the same as the quantity of I/O requests, and a sending unit configured to send, to the server, a reminder message that indicates an error in parsing the aggregation instruction when the quantity of operation fields of the at least one I/O request having the request sequence number is different from the quantity of I/O requests.

A fifth aspect of the embodiments of the present disclosure provides a server that is used in a data processing system. The data processing system further includes a storage system, and the storage system includes a controller and multiple storage devices. The server includes a communications interface, a memory, and a processor, the memory is configured to store program code, and the processor is configured to invoke the program code stored in the memory to perform the steps of receiving a data processing request using the communications interface, where the data processing request includes a request sequence number, and the request sequence number is used to mark the data processing request, generating at least one I/O request according to the data processing request, adding the request sequence number to each of the at least one I/O request, merging the I/O requests having the request sequence number, and generating an aggregation instruction when a quantity of I/O requests having the request sequence number is greater than a preset threshold, and sending the aggregation instruction to the controller of the storage system using the communications interface.

In a first possible implementation of the fifth aspect, the aggregation instruction includes an operation field corresponding to each merged I/O request and the quantity of the merged I/O requests.

With reference to the fifth aspect or the first possible implementation of the fifth aspect, in a second possible implementation of the fifth aspect, a reminder message that is sent by the controller of the storage system and that indicates an error in parsing the aggregation instruction is received using the communications interface, and the aggregation instruction is resent to the controller of the storage system using the communications interface.

A sixth aspect of the embodiments of the present disclosure provides a controller that is used in a storage system of a data processing system. The data processing system further includes a server, and the storage system further includes multiple storage devices. The controller includes a communications interface, a memory, and a processor, the memory is configured to store program code, and the processor is configured to invoke the program code stored in the memory to perform the steps of receiving, using the communications interface, an aggregation instruction sent by the server, parsing the aggregation instruction to obtain an operation field of at least one I/O request having a request sequence number and a quantity of I/O requests, collecting statistics on a quantity of operation fields of the at least one I/O request having the request sequence number, determining whether the quantity of operation fields of the at least one I/O request having the request sequence number is the same as the quantity of I/O requests, performing processing according to the operation field of the at least one I/O request if the quantity of operation fields of the at least one I/O request having the request sequence number is the same as the quantity of I/O requests, or sending, using the communications interface to the server, a reminder message that indicates an error in parsing the aggregation instruction if the quantity of operation fields of the at least one I/O request having the request sequence number is not same as the quantity of I/O requests.

In the embodiments of the present disclosure, the data processing request is received, where the data processing request includes the request sequence number that is used to mark the data processing request. The at least one I/O request is generated according to the data processing request, and the request sequence number is added to each generated I/O request. The I/O requests having the request sequence number are merged, and the aggregation instruction is generated when the quantity of I/O requests having the request sequence number is greater than the preset threshold, and the aggregation instruction is sent to the controller of the storage system. I/O requests generated according to a same data processing request are merged into an aggregation instruction, and the aggregation instruction is sent to the controller of the storage system such that the storage system may process the I/O requests of the same data processing request together to reduce a time taken to perform monitoring and management using a transaction mechanism, thereby simplifying the transaction mechanism.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

It should be noted that the terms used in the embodiments of the present disclosure are merely for the purpose of illustrating specific embodiments, and are not intended to limit the present disclosure. The terms "a", "said" and "the" of singular forms used in the embodiments and the appended claims of the present disclosure are also intended to include plural forms, unless otherwise specified in the context clearly. It should also be understood that the term "and/or" used in this specification indicates and includes any or all possible combinations of one or more associated listed items. In addition, in the specification, claims, and accompanying drawings of the present disclosure, the terms "first," "second," "third," "fourth," and so on are intended to distinguish between different objects, but do not indicate a particular order. In addition, the terms "including," "having," and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
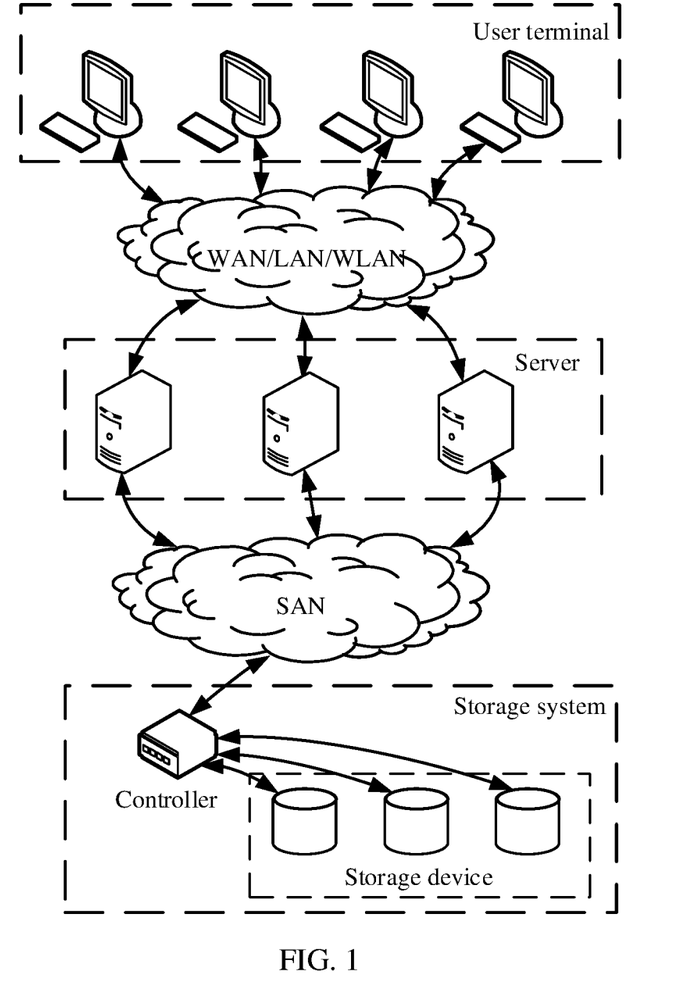
FIG. 1 is a schematic diagram of a network architecture according to an embodiment of the present disclosure.

To better understand a data processing method and apparatus, a server, and a controller that are disclosed in the embodiments of the present disclosure, a network architecture applicable to the embodiments of the present disclosure is first described below. Referring to FIG. 1, FIG. 1 is a schematic diagram of a network architecture according to an embodiment of the present disclosure. The network architecture shown in FIG. 1 may include a user terminal, a server, and a storage system. The storage system includes a controller and multiple storage devices. The user terminal may be in communication in connection with the server using a wide area network (WAN), a local area network (LAN), or a wireless LAN (WLAN). The server may be in communication in connection with the storage system using a SAN. In the network architecture shown in FIG. 1, the user terminal may include any type of user terminal device such as a mobile phone, a tablet computer, a personal digital assistant (PDA), a mobile Internet device (MID), or a smart wearable device (for example, a smart watch or a smart band). The server may include any type of server such as a file server or a mail server. The storage devices may include various storage devices such as optical drivers, disk arrays, and tape libraries. The user terminal and the storage devices are not limited in this embodiment of the present disclosure.

In the network structure shown in FIG. 1, the server sends an aggregation instruction for merging multiple I/O requests to the controller of the storage system using the SAN network. After preparing, according to the aggregation instruction, buffer space of output data corresponding to the aggregation instruction, the controller sends a transmission permission instruction to the server. After the server receives the transmission permission instruction, the server transmits the output data of the aggregation instruction. The controller accesses data according to the aggregation instruction and the output data, and feeds back an execution result and input data to the server after the access ends.

Figure 2:
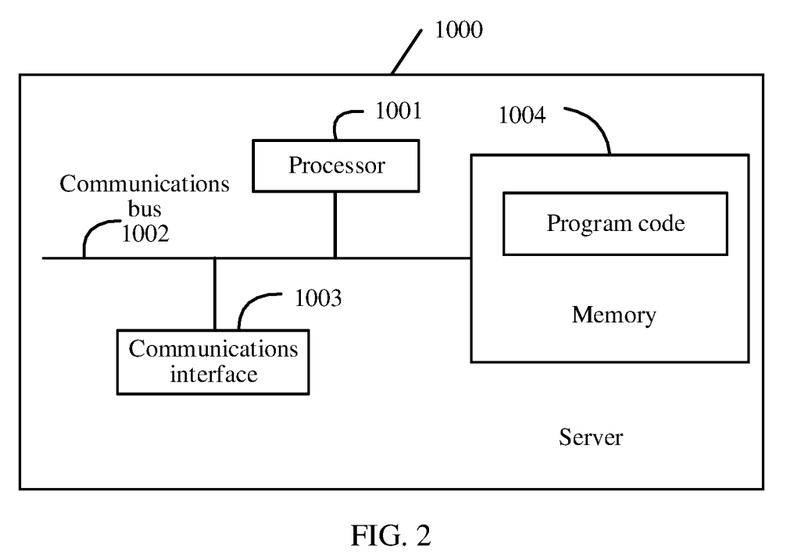
FIG. 2 is a schematic structural diagram of a server according to an embodiment of the present disclosure.

Based on the network architecture shown in FIG. 1, referring to FIG. 2, FIG. 2 is a schematic structural diagram of a server 1000 according to an embodiment of the present disclosure. As shown in FIG. 2, the server 1000 includes at least one processor 1001, for example, a central processing unit (CPU), at least one communications bus 1002, a communications interface 1003, and a memory 1004. The communications bus 1002 is configured to implement connection and communication between the components. Optionally, the communications interface 1003 may include a standard wired interface, a wireless interface, a SAN interface, or any new physical connection manner. The SAN interface may be a small computer system interface (SCSI), a serial storage architecture (SSA), a high-performance parallel interface (HIPPI), a fibre channel (FC), or the like. The memory 1004 may be a high speed random access memory (RAM), or may be a non-volatile memory, for example, at least one magnetic disk memory. As a computer storage medium, the memory 1004 may include a program code. In the server 1000 shown in FIG. 2, the wired interface and the wireless interface of the communications interface 1003 are used for communication connection between the server 1000 and a user terminal, and the SAN interface is used for communication connection between the server 1000 and a controller in a storage system.

Figure 3:
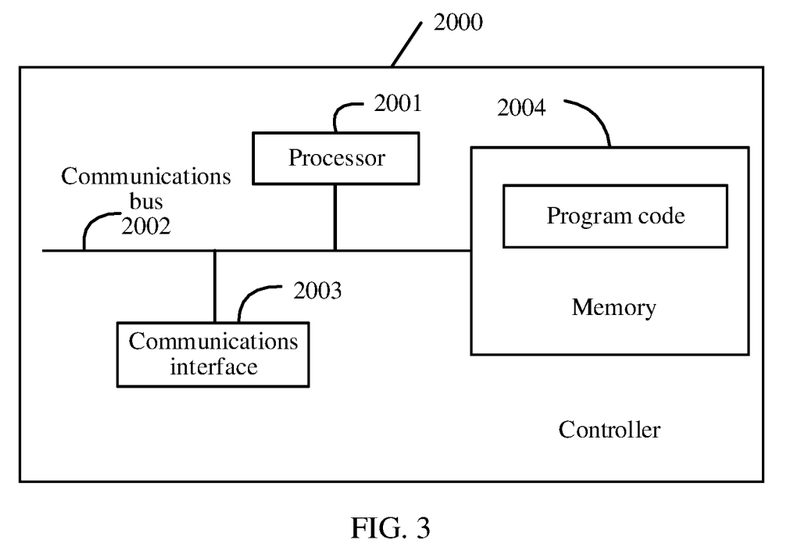
FIG. 3 is a schematic structural diagram of a controller according to an embodiment of the present disclosure.

Referring to FIG. 3, FIG. 3 is a schematic structural diagram of a controller 2000 according to an embodiment of the present disclosure. As shown in FIG. 3, the controller 2000 includes at least one processor 2001, for example, a CPU, at least one communications bus 2002, a communications interface 2003, and a memory 2004. The communications bus 2002 is configured to implement connection and communication between the components. Optionally, the communications interface 2003 may include a SAN interface or any new physical connection manner, and the SAN interface may be an SCSI interface, an SSA interface, an HIPPI interface, an FC interface, or the like. The memory 2004 may be a high speed RAM, or may be a non-volatile memory, for example, at least one magnetic disk memory. As a computer storage medium, the memory 2004 may include a program code. In the controller 2000 shown in FIG. 3, the SAN interface of the communications interface 2003 is used for communication in connection with the server 1000 shown in FIG. 2.

Figure 4:
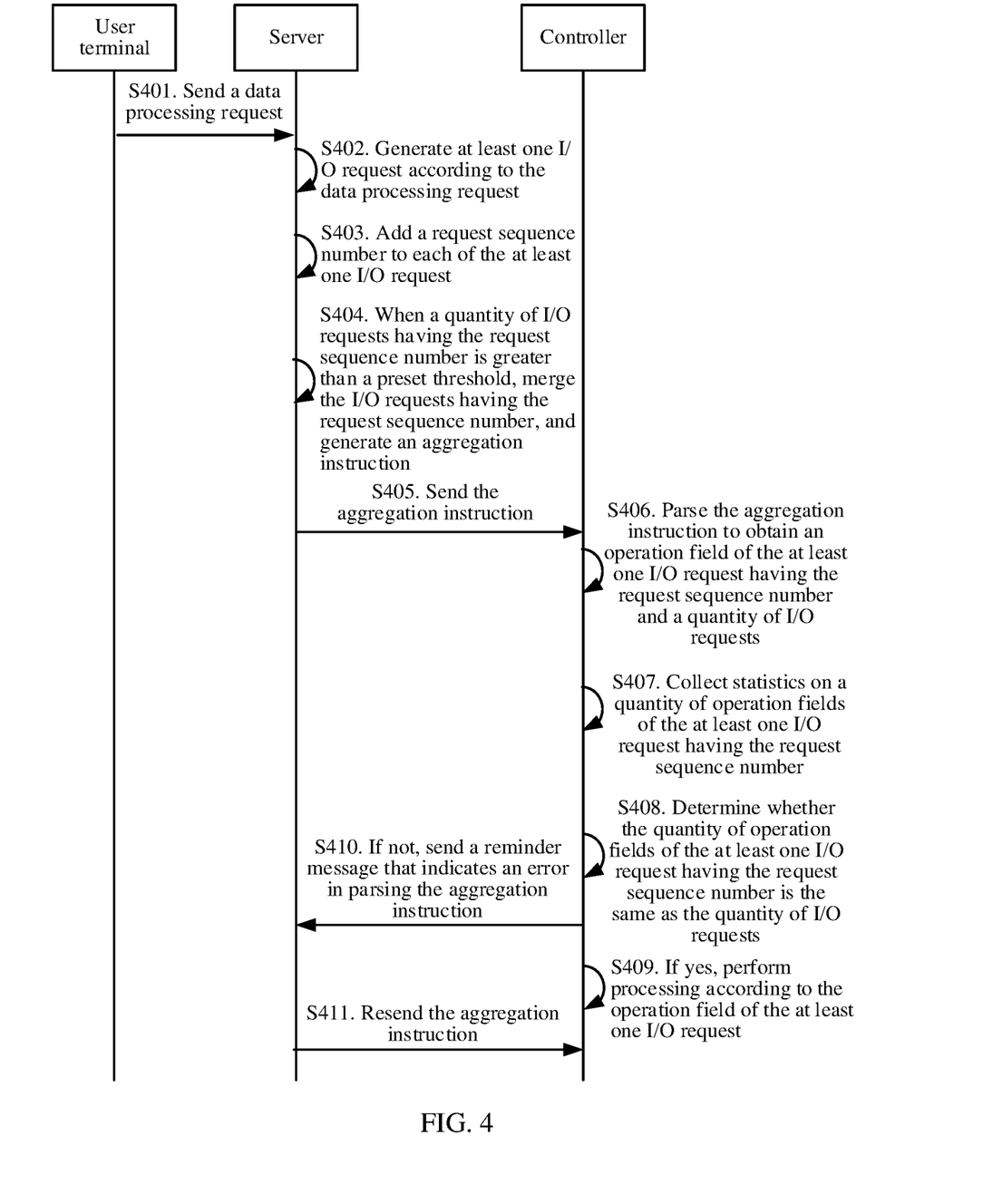
FIG. 4 is a schematic flowchart of a data processing method according to an embodiment of the present disclosure.

Referring to FIG. 4, FIG. 4 is a schematic flowchart of a data processing method according to an embodiment of the present disclosure. A detailed process of the data processing method is described from all perspectives of a server, a controller, and a user terminal in this embodiment of the present disclosure. With reference to the server 1000 in FIG. 2 and the controller 2000 in FIG. 3, the data processing method in this embodiment of the present disclosure may include the following step S401 to step S411.

Step S401: A server receives a data processing request sent by a user terminal.

The processor 1001 of the server 1000 receives, using the communications interface 1003 for communication with the user terminal, a data processing request sent by the user terminal. The data processing request includes a request sequence number. The request sequence number is used to differentially mark each different data processing request. That is, one data processing request corresponds to one request sequence number.

Step S402: The server generates at least one I/O request according to the data processing request.

The processor 1001 generates at least one I/O request according to the data processing request. For example, when the processor 1001 receives a data processing request that a bank account A transfers money to a bank account B, the processor 1001 parses the data processing request of the money transfer into two I/O requests, an I/O request used to reduce the bank account A by the transferred amount of money, and an I/O request used to increase the bank account B by the transferred amount of money.

It should be noted that, when at least two I/O requests are generated, the at least two I/O requests may be related to a same storage device in the storage system, or may be related to multiple storage devices in the storage system. This is not limited in this embodiment of the present disclosure.

Step S403: The server adds a request sequence number to each of the at least one I/O request.

The processor 1001 adds the request sequence number included in the data processing request to each of the at least one I/O request. That is, all I/O requests generated according to a same data processing request have a same request sequence number. Because different data processing requests correspond to different request sequence numbers, I/O requests generated according to different data processing requests correspond to different request sequence numbers. Further, whether I/O requests belong to a same data processing request may be determined according to request sequence numbers corresponding to the I/O requests.

Step S404: When a quantity of I/O requests having the request sequence number is greater than a preset threshold, the server merges the I/O requests having the request sequence number, and generates an aggregation instruction.

The processor 1001 determines whether a quantity of I/O requests having the request sequence number is greater than a preset threshold. The preset threshold is a positive integer equal to or greater than 1, and the preset threshold may be defined by the processor 1001. The processor 1001 merges the I/O requests having the request sequence number, and generates an aggregation instruction when the quantity of I/O requests having the request sequence number is greater than the preset threshold.

It should be noted that, when the quantity of I/O requests having the request sequence number is less than or equal to the preset threshold, in a first feasible solution, the processor 1001 may send the I/O requests having the request sequence number to the controller 2000 of the storage system such that the processor 2001 of the controller 2000 processes the received I/O requests. In a second feasible solution, assuming that the data request is a data processing request A, the processor 1001 determines whether there is a data processing request according to which a quantity of generated I/O requests is less than or equal to a preset threshold. For example, if there is a data processing request according to which a quantity of generated I/O requests is less than or equal to a preset threshold, it is assumed that the data processing request is a data processing request B. In this case, the processor 1001 merges the I/O requests generated according to the data processing request A and the I/O requests generated according to the data processing request B, and generates an aggregation instruction. In the second feasible solution, quantities of I/O requests generated according to different data processing requests are less than or equal to the preset threshold, and the generated I/O requests are merged to improve transmission efficiency of the I/O requests.

Step S405: The server sends the aggregation instruction to a controller of a storage system.

The processor 1001 sends the aggregation instruction to the controller 2000 of the storage system using the communications interface 1003. The aggregation instruction includes an operation field of each merged I/O request. For example, an operation field of a read operation request includes a read instruction, and an operation instruction of a write operation request includes a write instruction and data to be written. It should be noted that one I/O request corresponds to one operation field, and the operation field includes an identifier of a storage device whose data is accessed according to the I/O request.

In a feasible solution, the aggregation instruction further includes the quantity of the merged I/O requests.

Step S406: Parse the aggregation instruction to obtain an operation field of the at least one I/O request having the request sequence number and a quantity of I/O requests.

After receiving, using the communications interface 2003, the aggregation instruction sent by the server, the processor 2001 parses the aggregation instruction to obtain an operation field of the at least one I/O request having the request sequence number and a quantity of I/O requests.

Step S407: Collect statistics on a quantity of operation fields of the at least one I/O request having the request sequence number.

The processor 2001 collects statistics on a quantity of operation fields of the at least one I/O request having the request sequence number that are obtained by parsing the aggregation instruction.

Step S408: Determine whether the quantity of operation fields of the at least one I/O request having the request sequence number is the same as the quantity of I/O requests.

The processor 2001 determines whether the quantity, obtained by means of statistics collecting, of operation fields of the at least one I/O request having the request sequence number is the same as the quantity of I/O requests that is obtained by parsing. If the quantity, obtained by means of statistics collecting, of operation fields of the at least one I/O request having the request sequence number is the same as the quantity of I/O requests that is obtained by parsing, step S409 is performed. If the quantity, obtained by means of statistics collecting, of operation fields of the at least one I/O request having the request sequence number is different from the quantity of I/O requests that is obtained by parsing, step S410 is performed.

Step S409: If yes, perform processing according to the operation field of the at least one I/O request.

If the processor 2001 determines that the quantity, obtained by means of statistics collecting, of operation fields of the at least one I/O request having the request sequence number is the same as the quantity of I/O requests that is obtained by parsing, the processor 2001 sends, according to an identifier of a storage device whose data is accessed, an I/O request to the storage device corresponding to the storage device identifier to complete data access, where the identifier is included in an operation field of the I/O request.

It should be noted that, to ensure data consistency, the processor 2001 monitors, using a transaction mechanism, a processing progress of the I/O requests having the request sequence number. If the processing cannot be continued due to a fault during data access, data access that has been completed in the I/O requests having the request sequence number needs to be canceled fully, and the I/O requests are returned to an initial status. However, because the I/O requests having the request sequence number are merged into a same aggregation instruction, compared with the other approaches, a time taken to perform monitoring and management using the transaction mechanism may be reduced in this embodiment of the present disclosure.

Step S410: If not, send, to the server, a reminder message that indicates an error in parsing the aggregation instruction.

If the processor 2001 determines that the quantity, obtained by means of statistics collecting, of operation fields of the at least one I/O request having the request sequence number is different from the quantity of I/O requests that is obtained by parsing, the processor 2001 sends, using the communications interface 2003 to the server 1000, a reminder message indicating an error in parsing the aggregation instruction such that the server 1000 resends the aggregation instruction.

Step S411: Resend the aggregation instruction to the controller of the storage system.

After the processor 1001 receives, using the communications interface 1003, the reminder message that indicates an error in parsing the aggregation instruction and that is sent by the controller 2000 of the storage system, the processor 1001 resends the aggregation instruction to the controller 2000. It may be understood that, after receiving the aggregation instruction using the communications interface 2003, the controller 2000 continues to perform step S406 to step S410.

In this embodiment of the present disclosure, the data processing request is received, where the data processing request includes the request sequence number that is used to mark the data processing request. The at least one I/O request is generated according to the data processing request, and the request sequence number is added to each generated I/O request, the I/O requests having the request sequence number are merged, and the aggregation instruction is generated when the quantity of I/O requests having the request sequence number is greater than the preset threshold, and the aggregation instruction is sent to the controller of the storage system. I/O requests generated according to a same data processing request are merged into an aggregation instruction, and the aggregation instruction is sent to the controller of the storage system such that the storage system may process the I/O requests of the same data processing request together to reduce a time taken to perform monitoring and management using a transaction mechanism, thereby simplifying the transaction mechanism.

Figure 5:
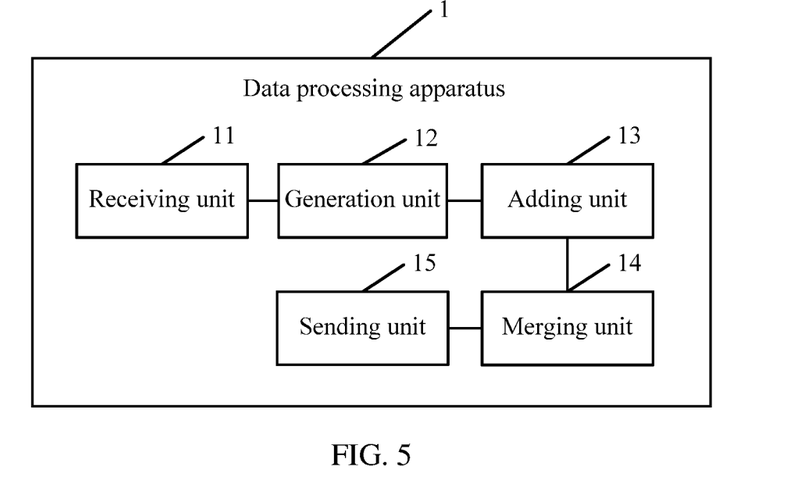
FIG. 5 is a schematic structural diagram of a data processing apparatus according to an embodiment of the present disclosure.

Based on the network architecture shown in FIG. 1, referring to FIG. 5, FIG. 5 is a schematic structural diagram of a data processing apparatus 1 according to an embodiment of the present disclosure. As shown in FIG. 5, the data processing apparatus 1 in this embodiment of the present disclosure may include a receiving unit 11, a generation unit 12, an adding unit 13, a merging unit 14, and a sending unit 15.

The receiving unit 11 is configured to receive a data processing request. The data processing request includes a request sequence number, and the request sequence number is used to mark the data processing request.

The generation unit 12 is configured to generate at least one I/O request according to the data processing request.

The adding unit 13 is configured to add the request sequence number to each of the at least one I/O request.

The merging unit 14 is configured to merge the I/O requests having the request sequence number, and generate an aggregation instruction when a quantity of I/O requests having the request sequence number is greater than a preset threshold.

The sending unit 15 is configured to send the aggregation instruction to the controller of the storage system.

In a feasible solution, the aggregation instruction includes an operation field corresponding to each merged I/O request and the quantity of the merged I/O requests.

In a feasible solution, the receiving unit 11 is further configured to receive a reminder message that is sent by the controller of the storage system and that indicates an error in parsing the aggregation instruction. The sending unit 15 is further configured to resend the aggregation instruction to the controller of the storage system.

This embodiment of the present disclosure and the method embodiments are based on a same idea and technical effects thereof are also the same. For detailed principles, refer to descriptions of the method embodiments, and details are not described herein again.

Figure 6:
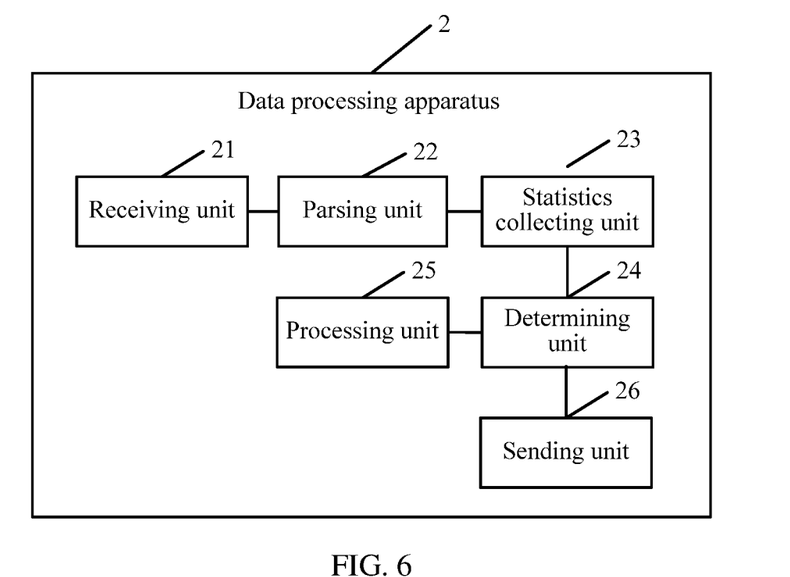
FIG. 6 is a schematic structural diagram of another data processing apparatus according to an embodiment of the present disclosure.

Based on the network architecture shown in FIG. 1, referring to FIG. 6, FIG. 6 is a schematic structural diagram of a data processing apparatus 2 according to an embodiment of the present disclosure. As shown in FIG. 6, the data processing apparatus 2 in this embodiment of the present disclosure may include a receiving unit 21, a parsing unit 22, a statistics collecting unit 23, a determining unit 24, a processing unit 25, and a sending unit 26.

The receiving unit 21 is configured to receive an aggregation instruction sent by the server.

The parsing unit 22 is configured to parse the aggregation instruction to obtain an operation field of at least one I/O request having a request sequence number and a quantity of I/O requests.

The statistics collecting unit 23 is configured to collect statistics on a quantity of operation fields of the at least one I/O request having the request sequence number.

The determining unit 24 is configured to determine whether the quantity of operation fields of the at least one I/O request having the request sequence number is the same as the quantity of I/O requests.

The processing unit 25 is configured to perform processing according to the operation field of the at least one I/O request when the quantity of operation fields of the at least one I/O request having the request sequence number is the same as the quantity of I/O requests.

The sending unit 26 is configured to send, to the server, a reminder message that indicates an error in parsing the aggregation instruction when the quantity of operation fields of the at least one I/O request having the request sequence number is different from the quantity of I/O requests.

This embodiment of the present disclosure and the method embodiments are based on a same idea and technical effects thereof are also the same. For detailed principles, refer to descriptions of the method embodiments, and details are not described herein again.

When the foregoing integrated unit is implemented in a form of a software functional unit and sold or used as an independent product, the integrated unit may be stored in a computer-readable storage medium. Based on such an understanding, the technical solutions of the present disclosure essentially, or the part contributing to the other approaches, or all or a part of the technical solutions may be implemented in a form of a software product. The software product is stored in a storage medium and includes several instructions for instructing a computer device (which may be a personal computer, a server, a network device, or the like, and may be a processor in a computer device) to perform all or a part of the steps of the foregoing methods described in the embodiments of the present disclosure. The foregoing storage medium includes any medium that can store program code, such as a universal serial bus (USB) flash drive, a removable hard disk, a magnetic disk, an optical disc, a read-only memory (ROM), or a random access memory (RAM).

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A data processing method implemented by a server in communication with a data processing system, the method comprising:
   receiving a data processing request comprising a request sequence number, wherein the request sequence number marks the data processing request;
   generating a plurality of input/output (I/O) requests according to the data processing request;
   attaching the request sequence number to each I/O request in the plurality of I/O requests;
   merging the I/O requests to generate an aggregation instruction when a quantity of the I/O requests is greater than a preset threshold, wherein the preset threshold is a positive integer greater than 1;
   sending, via a storage area network (SAN) through which the server and the data processing system are communicatively connected, the aggregation instruction to a controller in the data processing system, wherein the aggregation instruction comprises an operation field of each I/O request and an identifier of a storage device whose data is to accessed according to the data processing request;
   receiving, from the controller, a reminder message indicating an error in parsing the aggregation instruction when a quantity of operation fields is not equal to the quantity of I/O requests; and
   resending the aggregation instruction to the controller in response to the reminder message.

2. The data processing method of claim 1, wherein the aggregation instruction further comprises a value indicating the quantity of I/O requests merged into the aggregation instruction.

3. A server in a data processing system comprising a plurality of storage devices, the server comprising:
   a communications interface; and
   a processor coupled to the communications interface and configured to:
   receive a data processing request through the communications interface, wherein the data processing request comprises a request sequence number, and wherein the request sequence number marks the data processing request;
   generate a plurality of input/output (I/O) requests according to the data processing request, wherein each I/O request includes a request to access data in a same storage device selected from the plurality of storage devices;
   attach the request sequence number to each of the I/O requests;
   merge the I/O requests to generate an aggregation instruction when a quantity of the I/O requests is greater than a preset threshold, wherein the preset threshold is a positive integer greater than 1;
   send the aggregation instruction to a controller in the data processing system using the communications interface, wherein the communication interface comprises a storage area network (SAN) interface communicatively connecting the server to the controller via an SAN, wherein the SAN interface is configured to send the aggregation instruction from the server to the controller via the SAN, and wherein the aggregation instruction comprises an operation field of each I/O request and an identifier of the same storage device;
   receive, from the controller, a reminder message indicating an error in parsing the aggregation instruction when a quantity of operation fields is not equal to the quantity of I/O requests; and
   resend the aggregation instruction to the controller in response to the reminder message.

4. The server of claim 3, wherein the aggregation instruction further comprises a value indicating the quantity of I/O requests merged into the aggregation instruction.

5. The data processing method of claim 1, wherein the I/O requests are related to a same storage device identified by the identifier in the aggregation instruction.

6. The data processing method of claim 1, wherein the I/O requests are related to different storage devices.

7. The data processing method of claim 1, further comprising generating the preset threshold.

8. The server of claim 3, wherein the I/O requests are related to a same storage device.

9. The server of claim 3, wherein the I/O requests are related to different storage devices.

10. The server of claim 3, wherein the processor is further configured to generate the preset threshold.

11. A non-transitory computer readable medium comprising instructions executable by a processor of a server such that when executed, cause the server to implement a data processing method, the method comprising:
    receiving a data processing request comprising a request sequence number, wherein the request sequence number marks the data processing request;
    generating a plurality of input/output (I/O) requests according to the data processing request;
    attaching the request sequence number to each I/O request in the plurality of I/O requests;
    merging the I/O requests to generate an aggregation instruction when a quantity of the I/O requests is greater than a preset threshold, wherein the preset threshold is a positive integer greater than 1;
    sending, via a storage area network (SAN) through which the server and a data processing system are communicatively connected, the aggregation instruction to a controller in the data processing system, wherein the aggregation instruction comprises an operation field of each I/O request and an identifier of a storage device whose data is to accessed according to the data processing request;
    receiving, from the controller, a reminder message indicating an error in parsing the aggregation instruction when a quantity of operation fields is not equal to the quantity of I/O requests; and resending the aggregation instruction to the controller in response to the reminder message.

\* \* \* \* \*